United States Patent
Noble et al.

(10) Patent No.: US 7,028,153 B1
(45) Date of Patent: Apr. 11, 2006

(54) BACKUP AND RETRIEVAL OF DATA STORAGE USING CATALOG DATA

(75) Inventors: Charles Barry Noble, Winter Springs, FL (US); Kenneth Lowrie, Lake Mary, FL (US); Clint McVey, Longwood, FL (US); Ernest Patrick Hanavan, III, Winter Springs, FL (US)

(73) Assignee: VERITAS Operating Corporation, Mountain View, CA (US)

( * ) Notice: Subject to any disclaimer, the term of this patent is extended or adjusted under 35 U.S.C. 154(b) by 665 days.

(21) Appl. No.: 10/173,960

(22) Filed: Jun. 19, 2002

(51) Int. Cl.
*G06F 12/16* (2006.01)

(52) U.S. Cl. ..................... 711/162; 711/161

(58) Field of Classification Search ........ 711/112, 711/114, 162; 707/202, 204; 714/6, 7, 13; 715/735, 748
See application file for complete search history.

(56) References Cited

U.S. PATENT DOCUMENTS

| | | | |
|---|---|---|---|
| 5,381,545 A * | 1/1995 | Baker et al. ........... | 714/19 |
| 5,852,713 A * | 12/1998 | Shannon ............... | 714/6 |
| 5,897,661 A * | 4/1999 | Baranovsky et al. ... | 711/170 |
| 5,956,733 A * | 9/1999 | Nakano et al. ........ | 707/204 |
| 6,167,459 A | 12/2000 | Beardsley et al. | |
| 6,421,684 B1 * | 7/2002 | Cabrera et al. ....... | 707/200 |
| 6,600,498 B1 * | 7/2003 | Chow .................. | 715/769 |
| 6,615,225 B1 * | 9/2003 | Cannon et al. ........ | 707/204 |
| 6,732,293 B1 * | 5/2004 | Schneider ............. | 714/15 |
| 6,785,786 B1 | 8/2004 | Gold et al. | |
| 6,820,180 B1 | 11/2004 | McBrearty et al. | |
| 6,832,229 B1 * | 12/2004 | Reed .................... | 707/202 |
| 2002/0107877 A1 * | 8/2002 | Whiting et al. ....... | 707/204 |
| 2003/0069903 A1 * | 4/2003 | Gupta et al. .......... | 707/204 |
| 2004/0139270 A1 * | 7/2004 | Masuda et al. ........ | 711/1 |

* cited by examiner

*Primary Examiner*—Kevin Verbrugge
*Assistant Examiner*—Daniel Ko
(74) *Attorney, Agent, or Firm*—Meyertons Hood Kivlin Kowert & Goetzel, P.C.; B. Noël Kivlin

(57) ABSTRACT

One or more computer systems, a carrier medium, and a method are provided for backing up data using a backup server. The user may instruct backup software on a backup server to identify a second computer system (other than the backup server) as the parent computer system of the backed-up files. The backup software may receive the name of this second computer system as input, and the backup software may then output the name to a catalog during the backup process. When the backed-up data is restored, the catalog may be used to identify the parent of the backed-up data as the second computer system. In one embodiment, the data to be backed up may be part of a mirror which comprises substantially the same data as an original data volume. A carrier medium may include program instructions which, when executed, cause the above operations on one or more computer systems.

21 Claims, 5 Drawing Sheets

BACKUP AND RETRIEVAL OF DATA STORAGE USING CATALOG DATA

BACKGROUND OF THE INVENTION

1. Field of the Invention

This invention is related to the field of computer systems and, more particularly, to backup and retrieval of data in computer systems.

2. Description of the Related Art

Computer systems and their components are subject to various failures which may result in the loss of data. For example, a storage device used in or by the computer system may experience a failure (e.g., mechanical, electrical, magnetic, etc.) which may make any data stored on that storage device unreadable. Erroneous software or hardware operation may corrupt the data stored on a storage device and effectively destroy the data stored on an otherwise properly functioning storage device. Any component in the storage chain between (and including) the storage device and the computer system may experience failure (e.g., the storage device, connectors [e.g., cables] between the storage device and other circuitry, the network between the storage device and the accessing computer system [in some cases], etc.).

To mitigate the risk of losing data, computer system users typically make backup copies of data stored on various storage devices. Typically, backup software is installed on a computer system, and the backup may be scheduled to occur periodically and automatically. Backups may also be initiated manually by a user or administrator of the computer system.

Second-host backup may allow use of a dedicated backup server to back up data owned and/or used by an application server. In doing so, the application server may be relieved of the overhead associated with the backup process. When the backed-up data is restored, however, the data may appear to originate from the backup server, not the application server. This incorrect linkage may complicate incremental and differential backups in the future.

To link the backed-up data with its original source, users of second-host backup systems might maintain an association between a backup set on a backup server and the server and/or volume from which that set originated. However, maintenance of such an association would be inconvenient even for the most technical of users.

Therefore, an improved system and method for performing second-host backup are desired.

SUMMARY OF THE INVENTION

A system and method for second-host backup using device name aliasing are provided. One or more computer systems, a carrier medium, and a method are provided for backing up data using a backup server. A user may instruct backup software on a backup server (i.e., a first computer system) to initiate a backup. The user may instruct the backup software to identify a computer system other than the backup server as the parent computer system of the backed-up files. The backup software may receive the name of this second computer system as input.

In one embodiment, a first volume may be mounted on a first computer system (e.g., a backup server). The first volume comprises stored data having a parent computer system. After mounting the first volume, the first computer system is the parent computer system of the stored data on the first volume. This first volume may originally have been mounted on another computer system, such as an application server.

At least a portion of the stored data may be copied from the first volume on the first computer system to a second volume (e.g., a backup volume). Catalog data regarding the backed-up data may be stored in a catalog. The catalog data describes attributes of the stored data on the second volume, and the catalog data identifies the second computer system (the name of which has been received as input by the backup software), not the first computer system, as the parent computer system of the stored data on the second volume.

When the backed-up data is restored, the catalog data may be used to identify the parent of the stored data on the second volume as the second computer system. At least a portion of the stored data on the second volume may then be copied (to a third volume on the second computer system, for example).

In one embodiment, the data to be backed up may be part of a mirror. In this embodiment, the stored data may also be stored on a third volume (e.g., an original data volume) as well as the first volume (e.g., the mirror) before the first volume is mounted on the first computer system (i.e., the backup server). The third volume (e.g., the original data volume) may be mounted on the second computer system. The mirror may be maintained such that the mirror comprises substantially the same data as the original data volume.

A carrier medium may include program instructions which, when executed, cause the above operations on one or more computer systems.

BRIEF DESCRIPTION OF THE DRAWINGS

The following detailed description makes reference to the accompanying drawings, which are now briefly described.

Figure 1:
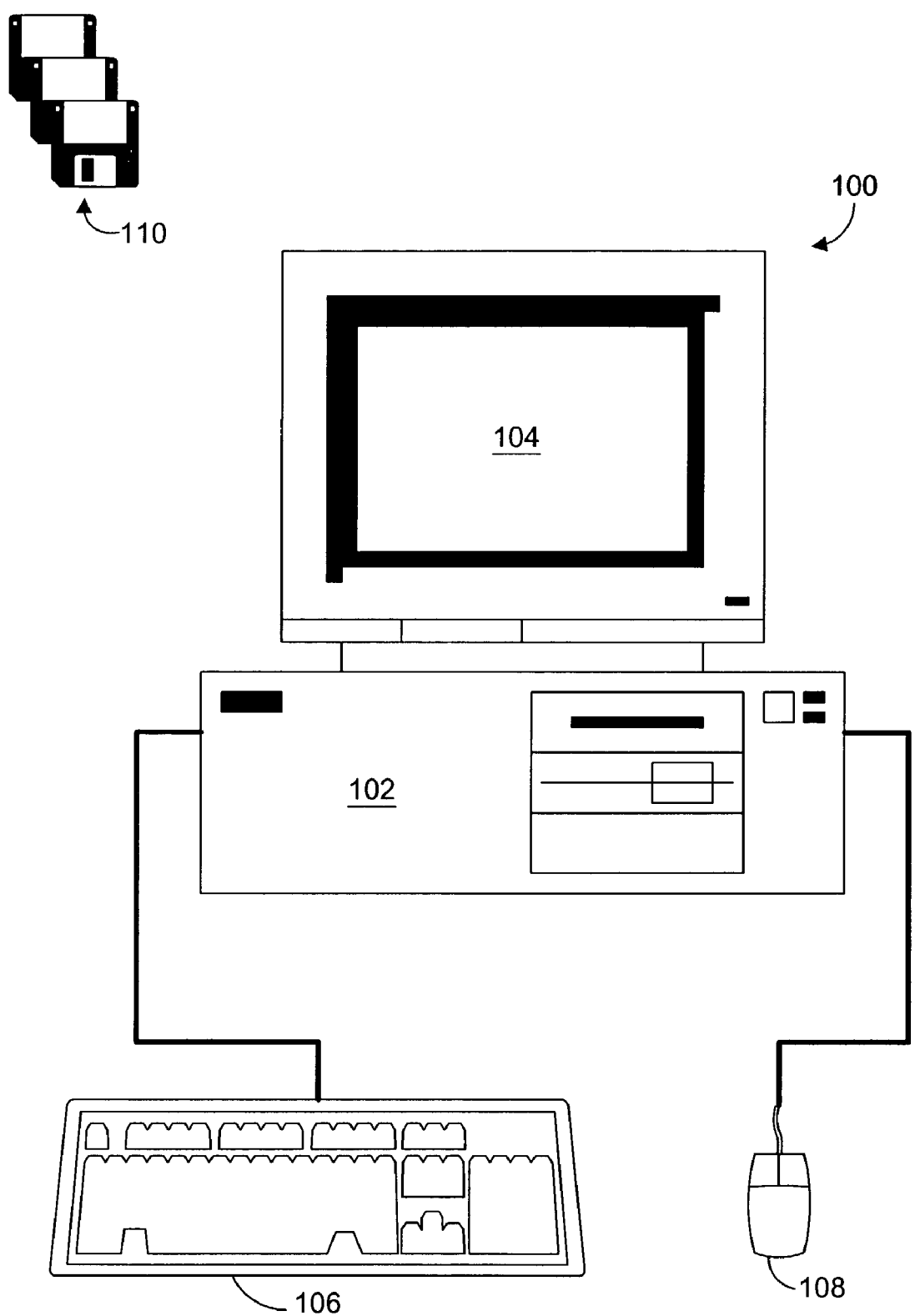
FIG. 1 illustrates a computer system which implements a system and method for device name aliasing according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1—A Computer System which Implements Device Name Aliasing

FIG. 1 illustrates a computer system 100 which implements a system and method for device name aliasing according to one embodiment. The computer system 100 may comprise components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. The computer programs include program instructions for performing second-host backup using device name aliasing. In various embodiments, the computer system 100 may comprise a desktop computer, a laptop computer, a palmtop computer, a network computer, a personal digital assistant (PDA), an embedded device, a smart phone, or any other suitable computing device.

Figure 2:
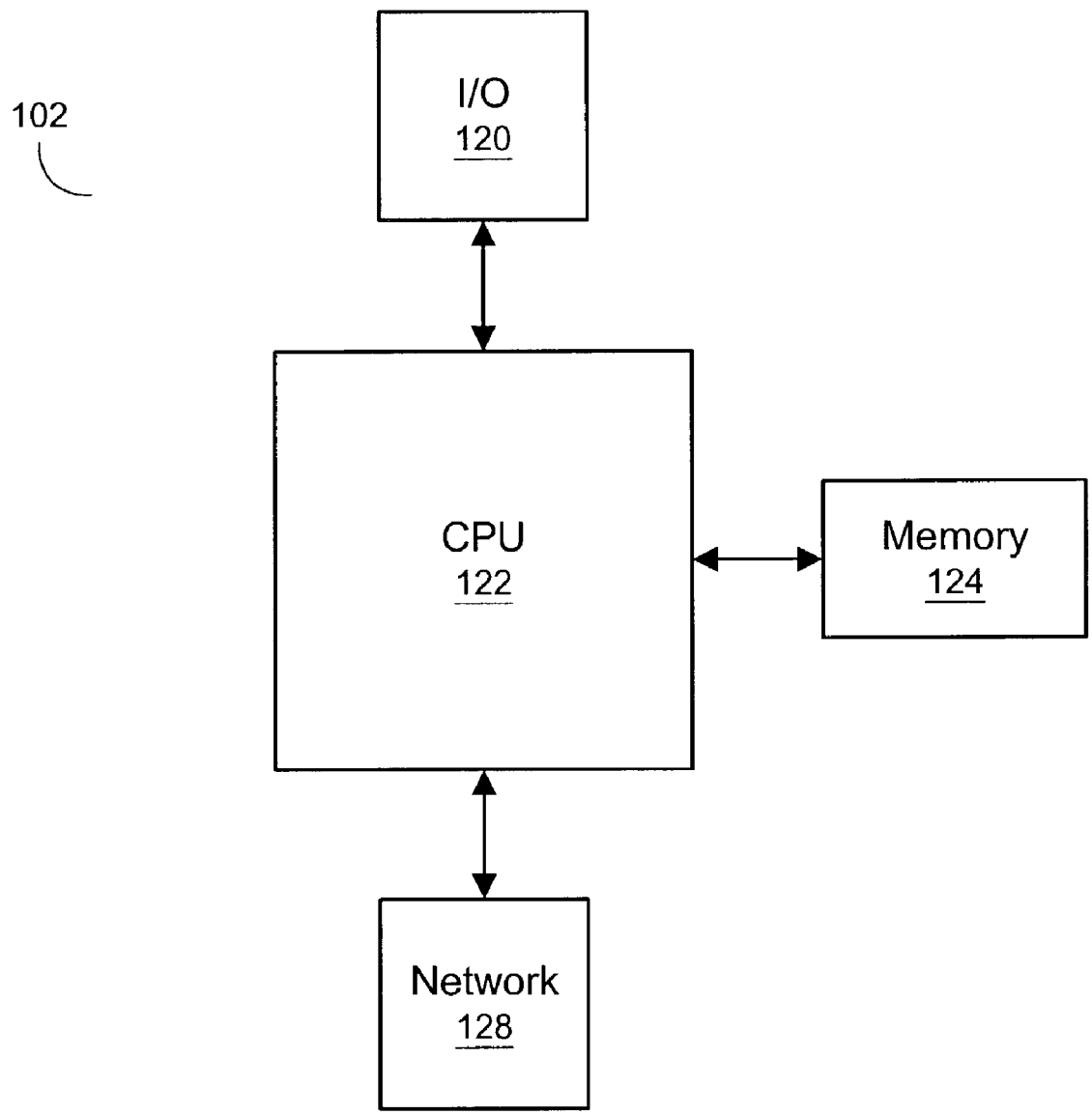
FIG. 2 is a block diagram of the computer system of FIG. 1 which implements a system and method for device name aliasing according to one embodiment.

FIG. 2—Computing Hardware of a Computer System which Implements Device Name Aliasing FIG. 2 is a block diagram illustrating the computing hardware 102 of the computer system 100 which implements a system and method for device name aliasing according to one embodiment. The computing hardware 102 includes at least one central processing unit (CPU) or other processor(s) 122. The CPU 122 may be configured to execute program instructions which implement the system and method for device name aliasing as described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the system and method for device name aliasing as described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the system and method for device name aliasing as described herein through the input/output bus 120.

The CPU 122 may include a network interface device 128 for coupling to a network. The network may be representative of various types of possible networks: for example, a local area network (LAN), wide area network (WAN), or the Internet. The system and method for device name aliasing as described herein may therefore be implemented on a plurality of heterogeneous or homogeneous networked computer systems such as computer system 100 through one or more networks. Each computer system 100 may acquire program instructions and/or data for implementing the system and method for device name aliasing as described herein over the network.

Figure 3A:
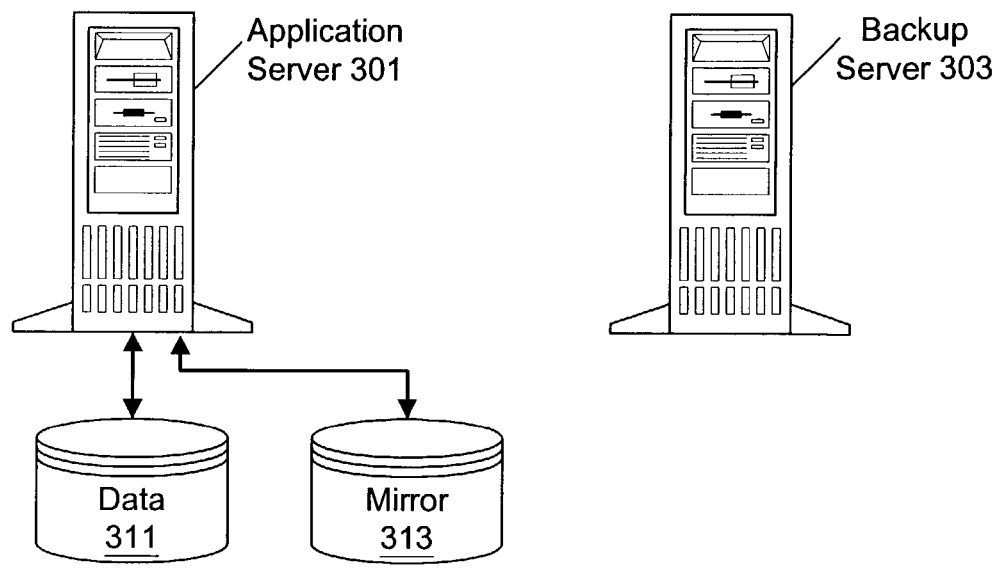
FIG. 3a is a block diagram of an application server computer system, a backup server computer system, and mirrored data storage according to one embodiment.
Figure 3B:
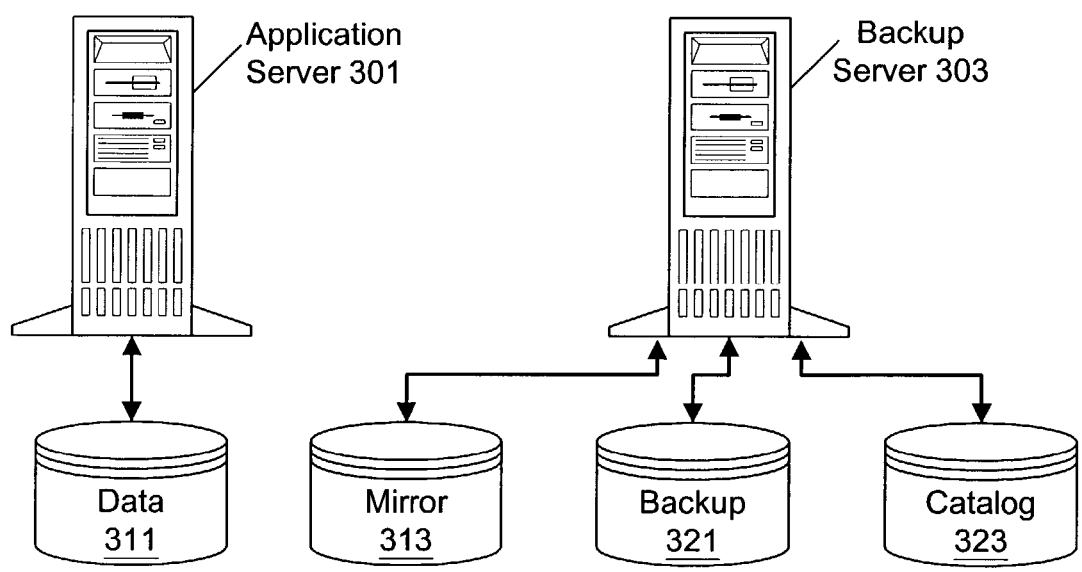
FIG. 3b is a block diagram of an application server computer system, a backup server computer system, and backup data storage according to one embodiment.
Figure 4:
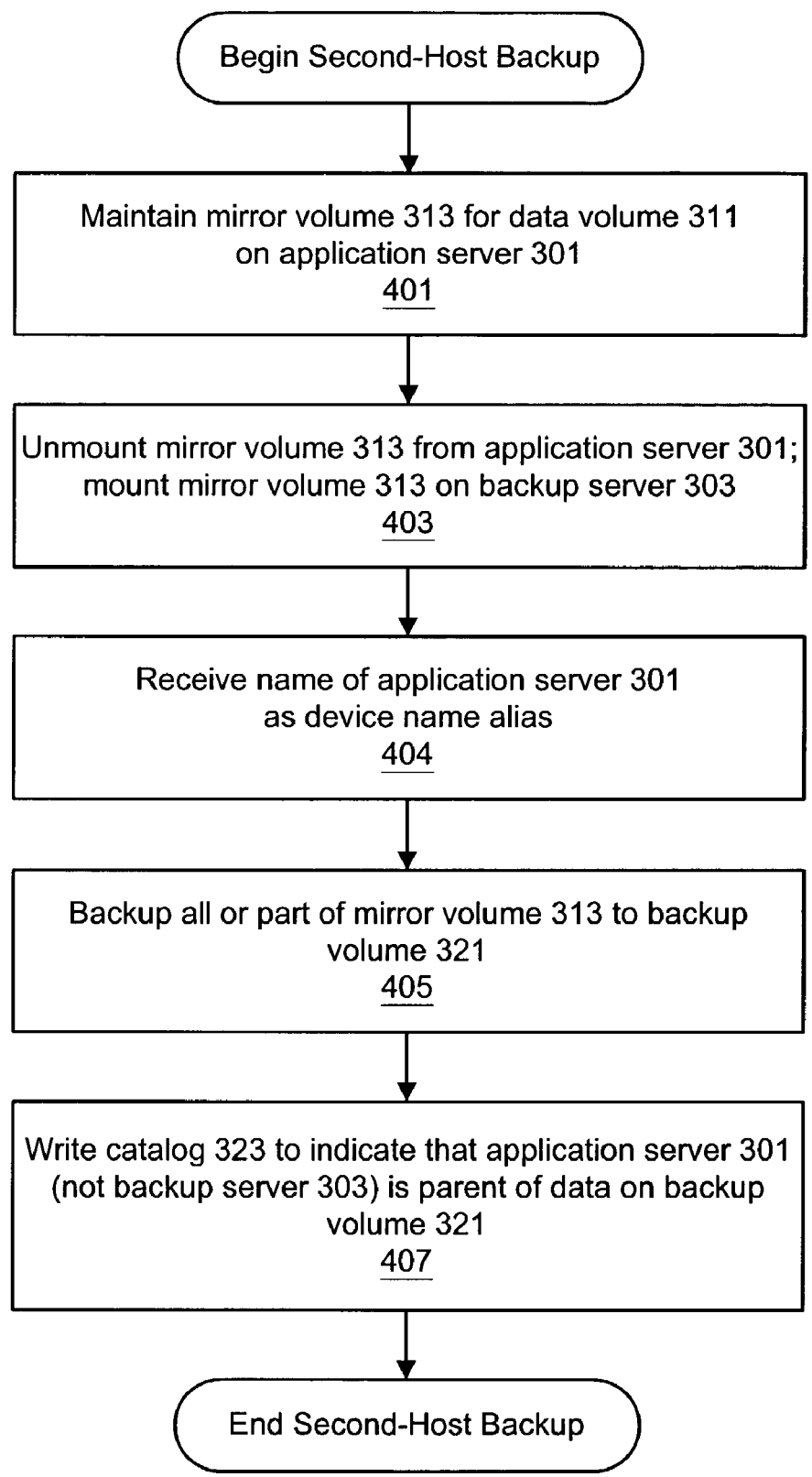
FIG. 4 is a flowchart illustrating second-host backup using device name aliasing according to one embodiment.
Figure 5:
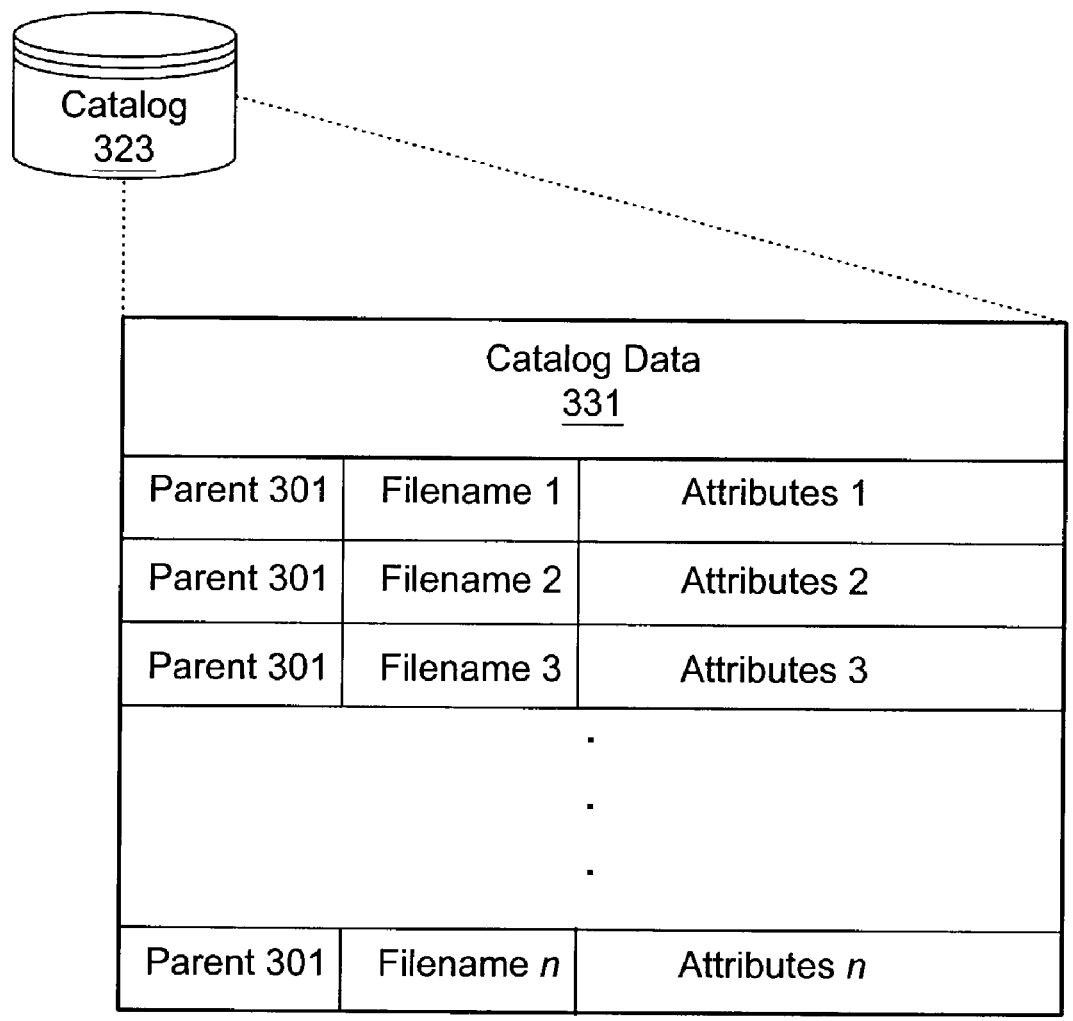
FIG. 5 is a block diagram of a catalog and an example of catalog data according to one embodiment.

FIGS. 3 Through 5—Second-Host Backup Using Device Name Aliasing

Second-host backup may allow use of a dedicated backup server 303 to back up data owned and/or used by an application server 301. In doing so, the application server 301 may be relieved of the overhead associated with the backup process. FIG. 3a is a block diagram of an application server computer system, a backup server computer system, and mirrored data storage according to one embodiment. FIG. 3b is a block diagram of an application server computer system, a backup server computer system, and backup data storage according to one embodiment. FIG. 4 is a flowchart illustrating a method for second-host backup using device name aliasing according to one embodiment.

As used herein, an application server is a computer system that maintains (i.e., reads and writes) data on a storage device. The data may be mirrored to assist in assuring data integrity. As used herein, a backup server is a computer system that performs tasks related to backing up and restoring data. As used herein, a volume is a quantity of storage space on a storage medium (e.g., disk, tape, or volatile storage such as RAM). A volume is a logical storage device that does not necessarily correspond to any particular physical storage device. A physical storage device may include more than one volume, and a volume may span more than one physical storage device. As used herein, mounting a volume is a process of making a volume available for immediate access (e.g., reading and/or writing data to the volume) in a particular file system. Unmounting a volume is the process of making the volume unavailable for immediate access. As used herein, a mirror is a volume that substantially replicates the data stored on another volume. A mirror may also be referred to as a snapshot or a frozen image. As used herein, a catalog or file catalog is a collection of meta-data regarding one or more files and/or directories. A catalog may store catalog data which may include, for example, information regarding the parenthood, filename, ownership, access privileges, creation dates, modification dates, file size, and/or hierarchical relationships of one or more files and/or directories.

In one embodiment, the application server 301 may own a volume for data storage 311. As shown in 401, a mirror volume 313 may be created and/or maintained by the application server 301 such that the mirror 313 substantially replicates the data stored on the data volume 311.

A user may instruct backup software on a backup server to initiate a backup. To backup all or part of the stored data on the mirror, ownership of the mirror 313 may be transferred to the backup server 303. This transfer of ownership may be accomplished as shown in 403 by unmounting the mirror volume 313 from the application server 301 and mounting the mirror volume 313 on the backup server 303. Volume management software may be employed to split the mirror 313 and mount the mirror 313 on the backup server 303.

After mounting the mirror 313, the backup server 303 is the parent computer system of the stored data on the mirror 313. Prior to the transfer, the application server 301 was the parent computer system.

In 404, the user may instruct the backup software to identify a computer system other than the backup server as the parent computer system of the backed-up files. The backup software may receive the name of this second computer system as input. In various embodiments, the name of the second computer system (i.e., the device name alias) may be passed to the backup software through various user interfaces such as a command-line interface or a graphical user interface. For example, the application server 301 may be specified as the device name alias for a particular backup task. In one embodiment, substantially any computer system may be identified as the parent of the backed-up data in 404. In other words, a computer system other than the application server may be specified as the alias prior to the backup of the stored data.

In 405, all or part of the mirror volume 313 may be copied to the backup volume 321. In 407, catalog data 331 may be stored in the catalog 323 for the backed-up data. The catalog data describes attributes of the stored data on the second volume, and the catalog data identifies the application server 301 (the name of which has been received as input by the backup software), not the backup server 303, as the parent computer system of the stored data on the second volume. FIG. 5 illustrates an example of catalog data showing the application server 301 (specified as the device name alias in 404) as the parent of the associated data on the backup volume 321.

In one embodiment, the backup server may reset any modified bits or archive bits on the data volume 311 as the backup progresses. In one embodiment, a runtime status display of the backup job may display both the parent or current source of the data (i.e., the backup server 303) as well as the alias (e.g., the application server 301). However, error messages and entries in logs may reflect the actual parent so that errors can be attributed to the actual computer system that experienced them.

If and when the backed-up data is restored, the data will be associated or correlated with the specified alias (e.g., the application server 301) as its parent. Because backed-up data is identified in the file catalog 323 as originating from the single application server 301 (specified as the parent in the catalog 323) and not one or more backup servers 303, future backups (e.g., incremental and differential) may therefore work correctly. The use of the backup server 303 may be essentially transparent to users of the application server 301.

In one embodiment, the use of device name aliasing to perform a backup may be employed with an original data volume and not a mirror volume. In other words, one embodiment of the method and system described herein does not require maintenance or creation of a mirror volume.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. In a system comprising a first computer system and a second computer system, a method for backing up stored data on a first volume, wherein the second computer system is a parent computer system of the stored data on the first volume, the method comprising:
   transferring ownership of the stored data on the first volume to the first computer system, including mounting the first volume on the first computer system, whereby the first computer system becomes the parent computer system of the stored data on the first volume;
   receiving as input a name of the second computer system;
   copying at least a portion of the stored data from the first volume to a second volume; and
   storing catalog data in a catalog, wherein the catalog data describes attributes of the stored data on the second volume, and wherein the catalog data identifies the second computer system as the parent computer system of the stored data on the second volume.

2. The method of claim 1, further comprising:
   maintaining the first volume as a mirror of a third volume before mounting the first volume on the first computer system.

3. The method of claim 2,
   wherein the third volume is mounted on the second computer system, and wherein the second computer system is a parent computer system of stored data on the third volume.

4. The method of claim 2, further comprising:
   restoring the stored data by:
      using the catalog data to identify the parent of the stored data on the second volume as the second computer system; and
      copying at least a portion of the stored data on the second volume to the third volume on the second computer system.

5. The method of claim 2, further comprising:
   resetting archive bits on the third volume during the copying at least a portion of the stored data from the first volume to the second volume.

6. The method of claim 1,
   wherein the first computer system comprises a backup server.

7. The method of claim 1,
   wherein the second computer system comprises an application server.

8. A memory medium comprising program instructions for backing up stored data on a first volume in a system comprising a first computer system and a second computer system, wherein the second computer system is a parent computer system of the stored data on the first volume, wherein the program instructions are computer-executable to implement:
   transferring ownership of the stored data on the first volume to the first computer system, including mounting the first volume on the first computer system, whereby the first computer system becomes the parent computer system of the stored data on the first volume;
   receiving as input a name of the second computer system;
   copying at least a portion of the stored data from the first volume to a second volume; and
   storing catalog data in a catalog, wherein the catalog data describes attributes of the stored data on the second volume, and wherein the catalog data identifies the second computer system as the parent computer system of the stored data on the second volume.

9. The memory medium of claim 8, wherein the program instructions are further computer-executable to implement:
maintaining the first volume as a mirror of a third volume before mounting the first volume on the first computer system.

10. The memory medium of claim 9,
wherein the third volume is mounted on the second computer system, and wherein the second computer system is the parent computer system of stored data on the third volume.

11. The memory medium of claim 9, wherein the program instructions are further computer-executable to implement:
restoring the stored data by:
using the catalog data to identify the parent of the stored data on the second volume as the second computer system; and
copying at least a portion of the stored data on the second volume to the third volume on the second computer system.

12. The memory medium of claim 9, wherein the program instructions are further computer-executable to implement:
resetting archive bits on the third volume during the copying at least a portion of the stored data from the first volume to the second volume.

13. The memory medium of claim 8,
wherein the first computer system comprises a backup server.

14. The memory medium of claim 8,
wherein the second computer system comprises an application server.

15. A system comprising:
a first computer system comprising a first CPU;
a second computer system;
a first volume which is configured to store data, wherein the second computer system is a parent computer system of stored data on the first volume; and
a second volume which is configured to store data;
wherein the first computer system stores program instructions which are executable by the first CPU to:
transfer ownership of the stored data on the first volume to the first computer system, including mounting the first volume on the first computer system, whereby the first computer system becomes the parent computer system of the stored data on the first volume;
receive as input a name of the second computer system;
copy at least a portion of the stored data from the first volume to a second volume; and
store catalog data in a catalog, wherein the catalog data describes attributes of the stored data on the second volume, and wherein the catalog data identifies the second computer system as the parent computer system of the stored data on the second volume.

16. The system of claim 15, further comprising:
a third volume;
wherein the program instructions are further executable by the first CPU to:
maintain the first volume as a mirror of a third volume before mounting the first volume on the first computer system.

17. The system of claim 16,
wherein the third volume is mounted on the second computer system, and wherein the second computer system is the parent computer system of stored data on the third volume.

18. The system of claim 16,
wherein the program instructions are further executable to restore the stored data by:
using the catalog data to identify the parent of the stored data on the second volume as the second computer system; and
copying at least a portion of the stored data on the second volume to the third volume on the second computer system.

19. The system of claim 16,
wherein the program instructions are further executable by the first CPU to:
reset archive bits on the third volume during the copying at least a portion of the stored data from the first volume to the second volume.

20. The system of claim 15,
wherein the first computer system comprises a backup server.

21. The system of claim 15,
wherein the second computer system comprises an application server.

* * * * *